United States Patent Office 3,706,701
Patented Dec. 19, 1972

3,706,701
STABILIZATION OF POLYMERS
Peter Vincent Susi, 17 Starlit Drive,
Middlesex, N.J. 08846
No Drawing. Continuation-in-part of application Ser. No. 389,210, Aug. 12, 1964, which is a continuation-in-part of application Ser. No. 362,182, Apr. 23, 1964, both now abandoned. This application June 15, 1971, Ser. No. 153,447
Int. Cl. C08f 45/58; C08g 51/58; C08b 27/66
U.S. Cl. 260—45.85 V   8 Claims

ABSTRACT OF THE DISCLOSURE

Stabilization of organic plastic substrates versus the degrading effects of ultraviolet light is effected by incorporating therein stabilizing amounts of a p-methoxybenzylidenemalonic acid diester represented by the formula:

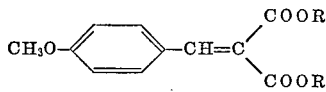

where R is a methyl or ethyl radical.

This application is a continuation-in-part of copending application Ser. No. 389,210, filed Aug. 12, 1964, now abandoned, which in turn is a continuation-in-part of application Ser. No. 362,182, filed Apr. 23, 1964, now abandoned.

This invention relates to the stabilization of organic plastic substrates and more particularly to the organic plastic substrates or polymer compositions stabilized against the deteriorative action of ultraviolet light by incorporation therein of a stabilizing amount of a p-methoxybenzylidenemalonic acid di-ester represented by the formula:

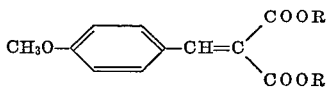

where R is a methyl or ethyl radical.

Various types of ultraviolet light absorbers have been proposed for the protection of plastic materials against the degrading effects of ultraviolet light. Thus, Lauerer et al., in German Auslegeschrift 1,087,902, Aug. 25, 1960 disclosed broadly a series of benzylidene derivatives (products obtained by the condensation of aromatic aldehydes with compounds containing an active methylene group) as ultraviolet light absorbers useful for the stabilization of plastic substrates. While these materials do absorb ultraviolet light and are to some degree effective stabilizers for plastics, they appear to lack stability under the effects of extended ultraviolet light exposure so that their useful application is quite limited.

The present invention is based on the discovery that the diesters as defined above have a high degree of stability to ultraviolet light and are especially useful as ultraviolet light absorbing compounds for the stabilization of various plastic substrates for prolonged periods. The specific compounds defined above are relatively unique in their high stability when exposed to ultraviolet light; other closely related compounds are very sensitive to the action of ultraviolet light, which limits their use as stabilizing agents, even though their absorption spectra would make them appear favorable for this purpose.

It is well known that ultraviolet light absorbers, to be effective stabilizers for plastics, must themselves be stable to ultraviolet radiation [F. J. Golemba and J. E. Guillet, "Mechanisms of Ultraviolet Stabilization of Polymer Films," J. Paint Technology, 41, 315 (1969)]. Thus, one of the deficiencies of the compounds disclosed as a class, in the above cited Auslegeschrift reference, is their instability to ultraviolet light so that protection of the substrate is afforded for only a limited amount of time.

In the case of the compounds of this invention, which are diesters, high stability to ultraviolet light is found, whereas closely related compounds, lacking the di-ester groups, are themselves not very stable to ultraviolet light.

This is illustrated in Table I, where only the last two compounds, numbered 16 and 17, which are compounds of this invention, show a high degree of stability when exposed to ultraviolet light, as indicated by the percent remaining after exposure when compared with a large series of compounds disclosed in the art as ultraviolet absorbers, for example, in the above cited Lauerer reference. These stabilities were determined as follows:

Approximately 80 mg. of the ultraviolet light absorber was dissolved in an acetone solution (25% solids) of cellulose acetate (Eastman Grade 398–6). A glass slide was dipped into the solution and the solvent allowed to evaporate. The residual film of cellulose acetate containing the absorber was then exposed to an ultraviolet light source for 100 hours and the percent of the ultraviolet light absorber remaining after exposure was measured spectrophotometrically.

TABLE I

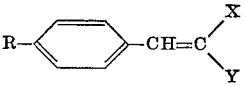

| Number | R | X | Y | Percent remaining after 100 hours exposure |
|---|---|---|---|---|
| 1 | CH₃O | CN | CN | 2 |
| 2 | CH₃O | CN | COOC₂H₅ | 8 |
| 3 | CH₃O | CN | CONH₂ | 25 |
| 4 | CH₃O | CONH₂ | CONH₂ | 23 |
| 5 | CH₃O | COOH | ⌬ | <10 |
| 6 | CH₃O | COOC₂H₅ | ⌬ | <10 |
| 7 | CH₃O | CN | COOC₁₈H₃₇ | 45 |
| 8 | CH₃O | COOH | COOH | 45 |
| 9 | H | CN | CN | 13 |
| 10 | H | CN | COOC₂H₅ | 58 |
| 11 | H | COOH | COOH | 37 |
| 12 | HO | CN | COOC₂H₅ | 26 |
| 13 | HO | CN | CONH₂ | 37 |
| 14 | HO | COOH | COOH | 58 |
| 15 | HO | CN | CN | 6 |
| 16 | CH₃O | COOCH₃ | COOCH₃ | 96 |
| 17 | CH₃O | COOC₂H₅ | COOC₂H₅ | 90 |

The compounds of the invention are useful as light stabilizers for various types of polymeric plastic compositions including, for example, halogenated polymers such as polyvinylchloride and polyvinylidene chloride; acrylates such as polymethylacrylate and poly-(methylmethacrylate); polystyrene; polyesters; melamine resins such as benzoguanamine-melamine-formaldehyde resins; polyolefins such as polyethylene and polypropylene; polycarbonates; and polyurethanes. They are of particular use in the stabilization of polyvinylchloride, polystyrene, and polycarbonates. In such compositions, as in the others, they are used in weight concentrations of from about 0.01 to 5 percent and preferably at concentrations of about 0.05 to 2.0 percent.

The compounds of this invention are conveniently prepared by the reaction of p-methoxybenzaldehyde with a malonic acid diester in the presence of a base, as is well-known in the art. In certain of the examples which follow, comparisons are made, in various substrates, of the stabilizing effect of compounds of the prior art with the compounds of this invention.

Compounds which are related chemically, in certain respects, to compounds of this invention have also been disclosed in the art as useful components for stabilizing compositions, but only in combination with certain phenolic antioxidants, for example, as disclosed in U.S. 3,244,668, Knapp et al. Apr. 5, 1966. Thus, according to the disclosure therein, certain benzylidene compounds in combination with certain antioxidants afford stabilization effects to substrates. However, in the case of the present invention, the compounds of the invention are surprisingly quite effective when used alone.

In addition, it is pointed out that the compounds specifically designated as compounds of this invention are unique in their stabilizing effects in that even with a closely related compound, where the methoxy group is in a position other than the para position, the superior stabilizing effects are not obtained. In addition, a compound with a closely related radical, such as a hydroxyl radical, in the para position of the phenyl ring is not as effective as the compounds of this invention having a methoxy radical in the para position.

As is often practised in the art, the compositions of the invention may also contain other additives such as pigments, fillers, antioxidants including those often referred to as hindered phenols exemplified by 2,6-di-t-butyl-p-cresol, and the like.

EXAMPLE 1

Diethyl p-methoxybenzylidenemalonate p-Methoxybenzaldehyde 136 g. (0.3 mole) is reacted with 160 g. (0.3 mole) of diethyl malonate in 100 cc. of benzene containing 2 cc. of piperidine. The reaction solution is refluxed for 20 hours with provision for distilling off water as it is formed. The product is isolated by distillation: B.P. 205–208° C. (3 mm. Hg); solidified on standing, M.P. 38–40° C.

EXAMPLE 2

When dimethyl malonate is substituted for diethyl malonate in the procedure of Example 1, dimethyl p-methoxybenzylidenemalonate is obtained, M.P. 55–57° C.

EXAMPLE 3

Polyvinylchloride compositions (rigid polyvinylchloride homopolymer) were prepared containing 0.25 percent or 0.5 percent of the compounds of this invention as well as closely related prior art compounds. The polyvinylchloride used is available commercially as "Geon 103 EP," and was heat stabilized with a commercial organo tin stabilizer, dibutyltin bis (isooctyl thioglycolate) (commercially "Thermolite 31") and stearic acid. In such formations, a wide variety of other heat stabilizers may also be used as exemplified by the following: basic lead salts, e.g. carbonate, stearate, phosphite, phthalate; sulfate lead salts; barium, cadmium and strontium soaps, e.g. ricinoleate, laurate, 2-ethyl hexanoate (mixtures of these soaps frequently give better results); tin compounds, e.g. dibutyl tin dilaurate; epoxy compounds, e.g. epoxy stearates; sodium organo phosphates; triaryl phosphites.

The compositions were exposed to ultraviolet light using a Fluorescent Sunlamp-Black Light (FS-BL) lamp, containing the exposure until a change of Yellow Index of 15 units were observed.

Some samples were also exposed oudoors in Florida sunshine for 15 months and the resulting discoloration was expresed as change of Yellow Index.

The degree of yellow color is measured in Yellow Index (Y.I.) units. The Yellow Index is determined on a differential colorimeter using the following formula (see Example 8, U.S. Pat. 3,079,366):

$$\text{Yellow Index} = 70 \left(1 - \frac{\text{Blue}}{\text{Green}}\right)$$

Results of these tests are given in Table II.

TABLE II

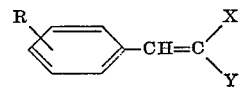

| Number | Conc. percent | R | X | Y | FS-BL exposure (hours to ΔYI of 15) | Florida exposure (ΔYI at 15 mo.) |
|---|---|---|---|---|---|---|
| 1 | None | | Control | | 125 | 29 |
| 1a | 0.25 | p-CH₃O | COOC₂H₅ | COOC₂H₅ | 450 | 10 |
| 1b | 0.25 | H | CN | COOC₂H₅ | 221 | 25 |
| 1c | 0.25 | H | COOC₂H₅ | COOC₂H₅ | 384 | 26 |
| 2 | None | | Control | | 127 | 29 |
| 2a | 0.5 | p-CH₃O | COOC₂H₅ | COOC₂H₅ | 565 | 8 |
| 2b | 0.5 | o-CH₃O | COOC₂H₅ | COOC₂H₅ | 411 | 13 |
| 2c | 0.5 | p-HO | COOC₂H₅ | COOC₂H₅ | 494 | 18 |
| 3 | None | | Control | | 120 | |
| 3a | 0.5 | p-CH₃O | COOCH₃ | COOCH₃ | 620 | |
| 3b | 0.5 | p-CH₃O | CN | COOC₁₈H₃₇ | 330 | |
| 3c | 0.5 | p-CH₃O | CN | COOC₁₀H₂₁ | 320 | |

The results shown in Table II clearly show the superiority of the products of this invention (Nos. 1a, 2a, and 3a) over closely related and prior-art compounds. Particularly surprising is the specificity of the position of the methoxy substituent as can be seen by comparing the activity of the p-methoxy derivative (No. 2a) with that of the isomeric o-methoxy derivative (No. 2b).

Further, the importance of the para-methoxy substituent can be seen by comparing the activity of the p-methoxy derivative (No. 2a) with that of the p-hydroxy derivative (No. 2c) of the prior art.

EXAMPLE 4

Polystyrene (Monsanto HF-77) compositions were prepared incorporating the compounds to be tested at 0.25 percent concentration. Samples of the polystyrene containing these compounds were then exposed in a Fade-Ometer. After varied periods of exposure, the degree of color change, expressed as Yellow Index, was determined.

The procedure used is described in further detail as follows:

To 100 grams of polystyrene was added 0.25 gram of the test compound and the composition was milled on a hot two-roll mill, one roll being maintained at 350° F. and the other at 250° F. The mixture was blended continuously over a ten minute period by repeatedly passing the mix through the nip of the rolls for about 20 passes. A small sample of this mix was then compression-molded into a 0.050″ x 2″ x 2½″ chip. The test chips, along with a control chip, were exposed in the Fade-Ometer. Before and after exposure, for varied periods of time, a Yellow Index reading was determined. For this purpose, reflectance measurements were made on a spectrophotometer and the Yellow Index in each instance was determined using the following formula wherein R is the reflectance measurement at the indicated wavelengths of 680, 420 and 560 nm.

$$Y.I.=\frac{\text{Percent R680}-\text{Percent R420}}{\text{Percent R560}}\times 100$$

The results are shown in Table III.

TABLE III

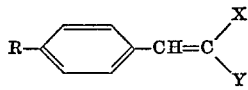

| Number | R | X | Y | Fade-Ometer exposure Yellow Index after— | | |
|---|---|---|---|---|---|---|
| | | | | 0 hrs. | 200 hrs. | 400 hrs. |
| 1 | | Control | | 6 | 26 | (²) |
| 2 [1] | $CH_3O$ | $COOCH_3$ | $COOCH_3$ | 5 | 8 | 13 |
| 3 [1] | $CH_3O$ | $COOC_2H_5$ | $COOC_2H_5$ | 5 | 10 | 17 |
| 4 | HO | $COOC_2H_5$ | $COOC_2H_5$ | 6 | 18 | 30 |
| 5 | H | $COOC_2H_5$ | $COOC_2H_5$ | 5 | 19 | 35 |
| 6 | HO | CN | $COOC_2H_5$ | 8 | 25 | (²) |
| 7 | $CH_3O$ | CN | $COOC_2H_5$ | 6 | 26 | (²) |
| 8 | H | CN | $COOC_2H_5$ | 5 | 34 | (²) |
| 9 | $CH_3O$ | CN | $CONH_2$ | 9 | 34 | (²) |
| 10 | HO | CN | CN | 17 | 40 | (²) |
| 11 | $CH_3O$ | CN | CN | 8 | 41 | (²) |
| 12 | HO | CN | $CONH_2$ | 40 | 61 | (²) |
| 13 | H | CN | CN | 5 | 79 | (²) |

[1] Compounds of this invention.
[2] Test discontinued at 200 hours because sample had degraded to inutility.

The above results again show the superiority of the products of this invention (Nos. 2 and 3) over prior art compound as ultraviolet light stabilizers.

EXAMPLE 5

Diethyl p-methoxybenzylidenemalonate and dimethyl p-methoxybenzylidene malonate were incorporated at 0.1% concentration into samples of benzoguanamine-melamine-formaldehyde resins having benzoguanamine: melamine ratios of about 1:16 and 1:49, respectively. The samples were exposed to ultraviolet radiation and found to be much more resistant to discoloration as compared to the controls.

EXAMPLE 6

Diethyl p-methoxybenzylidenemalonate and diethyl p-methoxybenzylidenemalonate were incorporated into poly(methylmethacrylate) (Cyanamid "Acrylite" H-11) at 0.045% conc. and molded plaques (50 mils) were exposed to ultraviolet radiation (Fluorescent lamp). After 8,000 hours exposure, a control sample with no stabilizer became quite yellow (Yellow Index 20), whereas the samples containing the above stabilizers showed no discoloration (Yellow Index 2).

EXAMPLE 7

Ten-gram samples of polycarbonate powder (Lexan) containing 0.5% of dimethyl p-methoxybenzylidenemalonate and diethyl p-methoxybenzylidenemalonate were heated at 300° C. and compression-molded into four mil films. The films were exposed in a Fluorescent Sunlamp-Black Light ultraviolet light source for 110 hours and 215 hours. A control film (5 mils) containing no stabilizer was also prepared and exposed simultaneously. The yellowness of the polymer after exposure was determined spectrophotometrically by measuring the percent transmission at 400 nm.

The data below (Table IV) show that the control sample showed a greater loss in transmission (increase in yellowness) than the stabilized samples.

TABLE IV

| Additive | FS-BL exposure, percent transmission at 400 nm. | | |
|---|---|---|---|
| | Initial | 110 hrs. | 215 hrs. |
| Control | 84 | 47 | |
| Dimethyl p-methoxybenzylidenemalonate | 86 | 63 | 55 |
| Diethyl p-methoxybenzylidenemalonate | 85 | 61 | 54 |

EXAMPLE 8

Dimethyl p-methoxybenzylidenemalonate and diethyl p-methoxybenzylidenemalonate were incorporated into a polyester resin (Cyanamid "Laminac" 4123) at 0.25% conc. according to the following procedure:

A solution of 0.25 gram of the additive in 5 grams of styrene containing 0.5 gram of benzoylperoxide was added to 95 grams of the polyester resin. The resin was cured at 120° C. to give ⅛" plaques. Also prepared were control plaques of polyester containing no ultraviolet light absorber additive. Samples of the polyester resins, thus prepared, were exposed in Florida and Arizona for a period of six months. The results obtained are shown in Table V. It can be seen that the control sample yellowed to a much greater extent than the samples containing the ultraviolet light absorbers of this invention.

TABLE V

| Sample | Initial Yellow Index | Δ (Yellow Index) | |
|---|---|---|---|
| | | Florida | Arizona |
| Control | 2 | 32 | 35 |
| Diethyl p-methoxybenzylidenemalonate | 2 | 15 | 12 |
| Dimethyl p-methoxybenzylidenemalonate | 3 | 18 | 16 |

The dimethyl and the diethyl ester derivatives of the invention are low melting solids, i.e., solid at room temperature. In most applications a solid stabilizer is suitable for use. However, in certain instances, depending on the type of polymer to which the stabilizer is applied, it is more convenient to use a stabilizer composition which is in the form of a liquid. This is particularly true, for example, when stabilization of a polymer such as polyvinyl chloride is to be effected. In such an application it is convenient to dissolve the stabilizer in a plasticizer which is to be used for the polyvinyl chloride system as the liquid form of the stabilizer dissolves more readily. Similarly, a liquid form of stabilizer is more suitable for incorporation into a poly urethane system.

Although the dimethyl and diethyl are low melting point solids, a combination of the two in various proportions provides a liquid form at normal ambient temperatures. Thus, a mixture of the two diesters is contemplated for applications such as discussed above.

A useful ratio of the two esters to provide a liquid composition is about one part of the dimethyl ester to two parts by weight of the diethyl ester. Such a liquid composition may be prepared by physically admixing the dimethyl ester with the diethyl ester in the indicated proportions. On the other hand, such liquid mixtures may also be prepared by use of a mixture of the dimethyl malonic ester and the diethyl malonic acid ester in the desired proportions in the preparation of the stabilizer by reaction with paramethoxy benzaldehyde.

I claim:

1. A synthetic organic polymer composition stabilized against the deteriorative effects of ultraviolet light which contains in admixture a stabilizing amount of a compound or mixture of compounds represented by the formula:

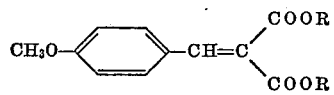

where R is a methyl or ethyl radical.

2. A composition of matter stabilized against the deteriorative effects of ultraviolet light which comprises a polymer selected from the group consisting of polyvinylchloride, polyvinylidene chloride, polymethylacrylate, poly(methylmethacrylate), polystyrene, melamine resins, polyesters and polycarbonates and from about 0.01% to about 5% by weight of a compound represented by the formula:

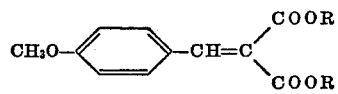

where R is a methyl or ethyl radical.

3. The composition of claim 2 wherein the polymer is polyvinylchloride.

4. The composition of claim 2 wherein the polymer is polystyrene.

5. The composition of claim 2 wherein the polymer is a polycarbonate.

6. The composition of claim 2 wherein the compound is dimethyl p-methoxybenzylidenemalonate.

7. The composition of claim 2 wherein the compound is diethyl p-methoxybenzylidenemalonate.

8. The composition of claim 2 wherein the compound is a mixture of about one part by weight of dimethyl p-methoxybenzylidenemalonate and two parts by weight of diethyl p-methoxybenzylidenemalonate.

References Cited

UNITED STATES PATENTS 3,244,668   4/1966   Knapp et al. _____ 260—45.85

DONALD E. CZAJA, Primary Examiner

V. P. HOKE, Assistant Examiner

U.S. Cl. X.R.

106—179; 260—23 XA, 45.7 P, 45.75 R, 45.75 K, 45.95 H, 45.95 R